US012659104B2

(12) United States Patent
Werner et al.

(10) Patent No.: US 12,659,104 B2
(45) Date of Patent: Jun. 16, 2026

(54) FIRST REFERENCE SIGNAL THAT COMPLEMENTS A SECOND REFERENCE SIGNAL

(71) Applicant: Telefonaktiebolaget LM Ericsson (publ), Stockholm (SE)

(72) Inventors: Karl Werner, Segeltorp (SE); David Astely, Bromma (SE); Petter Ersbo, Knivsta (SE); Eric Nordström, Bandhagen (SE); Niklas Wernersson, Kungsängen (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 35 days.

(21) Appl. No.: 18/720,132

(22) PCT Filed: Dec. 15, 2021

(86) PCT No.: PCT/EP2021/085971
§ 371 (c)(1),
(2) Date: Jun. 14, 2024

(87) PCT Pub. No.: WO2023/110090
PCT Pub. Date: Jun. 22, 2023

(65) Prior Publication Data
US 2025/0062872 A1 Feb. 20, 2025

(51) Int. Cl.
*H04L 5/00* (2006.01)
*H04B 7/0456* (2017.01)
(52) U.S. Cl.
CPC ......... *H04L 5/0048* (2013.01); *H04B 7/0456* (2013.01)

(58) Field of Classification Search
CPC .. H04B 7/0413; H04B 7/0697; H04B 7/0456; H04B 7/10; H04B 7/0682; H04B 7/0689;
(Continued)

(56) References Cited

U.S. PATENT DOCUMENTS

2019/0081737 A1* 3/2019 Huang ................. H04L 1/0026
2019/0341974 A1 11/2019 Kim et al.
(Continued)

FOREIGN PATENT DOCUMENTS

WO 2021161233 A1 8/2021

OTHER PUBLICATIONS

International Search Report and Written Opinion of the International Searching Authority, PCT/EP2021/085971, mailed Jul. 4, 2022, 11 pages.
(Continued)

*Primary Examiner* — Eva Y Puente
(74) *Attorney, Agent, or Firm* — Sage Patent Group

(57) ABSTRACT

A method performed by a network node. The method includes determining to transmit a first reference signal. The method also includes determining whether a second reference signal should be transmitted. The method also includes transmitting the first reference signal using a first precoder. The method also includes transmitting the second reference signal as a result of determining that the second reference signal should be transmitted. The second reference signal is transmitted using a second precoder that is complementary to the first precoder such that the second reference signal occupies a first part of a channel not occupied by the first reference signal.

19 Claims, 7 Drawing Sheets

(58) Field of Classification Search
CPC .. H04B 7/0482; H04B 7/0669; H04B 7/0469;
H04L 25/0391; H04L 5/005; H04L
25/0224; H04L 25/03898; H04L 1/0058;
H04L 25/067; H04L 27/2627; H04L
25/0222; H04L 5/0053; H04L 25/03343;
H04L 5/0048; H04L 1/0083; H04L
5/0044; H04W 72/044; H04W 52/42;
H04W 72/0446; H04W 72/23; H04W
4/06; H04W 76/40; H04W 16/26; H04W
16/28; H04W 52/0209; H04W 72/51;
H04W 24/10; H04W 72/53; H04W
72/563

See application file for complete search history.

(56)                References Cited

U.S. PATENT DOCUMENTS

| | | | |
|---|---|---|---|
| 2019/0363809 A1* | 11/2019 | Yoon ..................... | H04W 56/00 |
| 2021/0044400 A1* | 2/2021 | Jiang ..................... | H04L 5/0048 |
| 2022/0116089 A1* | 4/2022 | Khoryaev ............. | H04W 64/00 |
| 2022/0352932 A1* | 11/2022 | Malek Mohammadi .................... | |
| | | | H04B 7/0632 |
| 2024/0015725 A1* | 1/2024 | Rakib ................. | H04W 72/542 |
| 2024/0340049 A1* | 10/2024 | Hu ......................... | H04B 7/061 |

OTHER PUBLICATIONS

3rd Generation Partnership Project; Technical Specification Group
Radio Access Network; NR; Physical channels and modulation
(Release 16) 3GPP TS 38.211 V16.6.0 (Jun. 2021) 134 pages.

* cited by examiner

200 s202
Obtain scheduling information (SI)

s204
Based on the SI, Determine that a complementary RS should be transmitted s206
Determine allocation for the complementary RS s208
Determine a second precoder s210
Transmit the complemented RS and the complementary RS

400 s402

Determine a need for the transmitter to transmit a C-RS s404

Transmit to the transmitter SI that triggers transmitter to transmit the DMRS and the C-RS s406

Receive the DMRS and the C-RS s408

Estimate channel using the received RSs s410

Use the estimated channel estimate

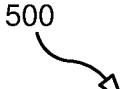

500

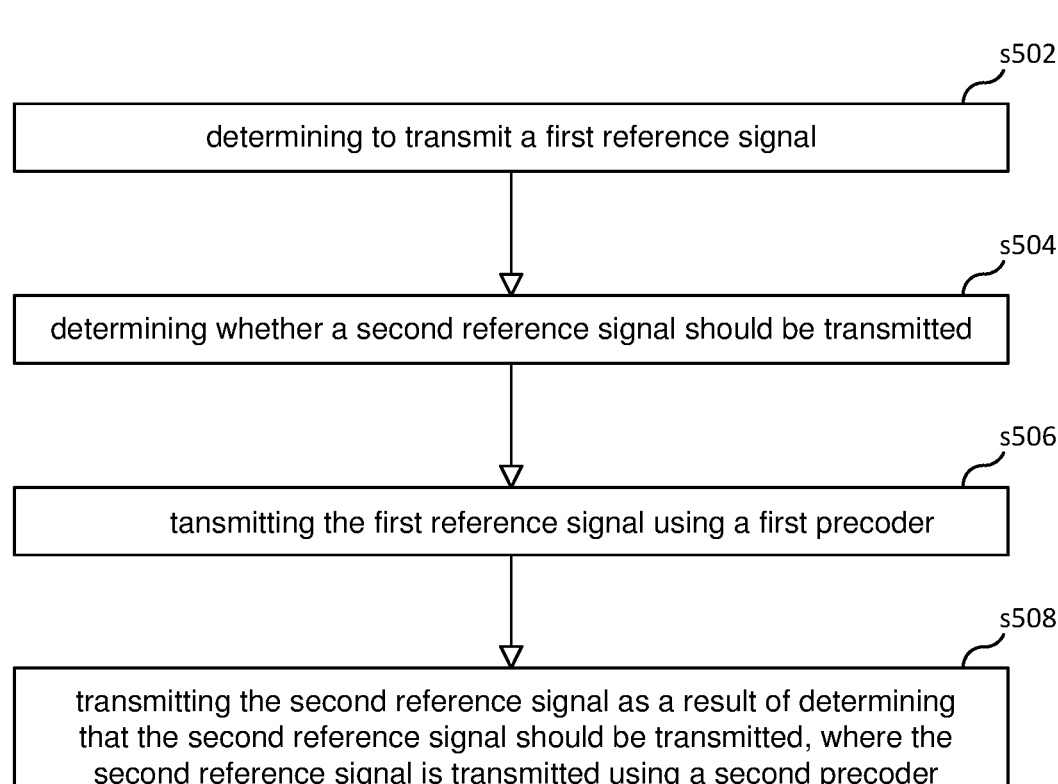

s502 determining to transmit a first reference signal s504 determining whether a second reference signal should be transmitted s506 tansmitting the first reference signal using a first precoder s508 transmitting the second reference signal as a result of determining that the second reference signal should be transmitted, where the second reference signal is transmitted using a second precoder that is complementary to the first precoder such that the second reference signal occupies a first part of a channel not occupied by the first reference signal

FIRST REFERENCE SIGNAL THAT COMPLEMENTS A SECOND REFERENCE SIGNAL

CROSS REFERENCE TO RELATED APPLICATIONS

This application is a 35 U.S.C. § 371 national stage application of PCT International Application No. PCT/EP2021/085971 filed on Dec. 15, 2021, the disclosure and content of which is incorporated by reference herein in its entirety.

TECHNICAL FIELD

Disclosed are embodiments related to the transmission (and reception) of reference signals.

BACKGROUND

The 3rd Generation Partnership Project (3GPP) New Radio (NR) standard specifies certain reference signals (a.k.a., "pilots"). A reference signal (RS) is a signal that is known to both the transmitter and the receiver. The transmission of an RS allows the receiver to create a representation of the radio channel (i.e., it allows the receiver to generate a channel estimate) between all or a subset of the transmit/receive (tx/rx) antenna pairs of a link, and a part of the band. The channel estimate is one type of channel state information (CSI).

Some NR reference signals can use several antenna ports (or "ports" for short). These are orthogonal streams, and having multiple ports allows the receiver to estimate the channel for multiple spatial filters (e.g., tx antennas).

The ports are separated (e.g., made orthogonal) by a combination of code division multiplexing (CDM) through use of orthogonal codes, frequency division multiplexing (FDM) through use of different subcarrier combs, and time division multiplexing (TDM) through use of multiple OFDM symbols.

The NR standard specifies a demodulation reference signal (DMRS) for both the Physical Downlink (DL) Shared Channel (PDSCH) and the Physical Uplink (UL) Shared Channel (PUSCH). A DMRS is used by a receiver to estimate a channel between the transmitter and the receiver. The estimate of the channel may then be used by the receiver to perform equalization (e.g., cancel the effect of the fading channel). A DMRS is transmitted using the same precoder (e.g. same spatial filter) as its associated data channel. This means that if the data channel is transmitted with R spatial layers (rank R), then the DMRS use exactly R ports, the orthogonal reference signal on each port being precoded as the corresponding data layer.

The NR standard also specifies a sounding reference signal (SRS). Typically, an SRS is transmitted on a set of ports that are independent to the ports used for transmission of data. Specifically, the number of ports used for SRS is not dependent on the transmission rank of data. SRSs are used to enable sounding of multiple ports, simultaneously or in sequence.

Channel estimates are needed not only for demodulation, but also for: i) precoder selection (e.g., the process of determining spatial weights for transmission of a data channel); ii) selection of transmission rank; and iii) Link adaptation (e.g., selection of code-rate and modulation order). Both DMRS and SRS can be used for these purposes.

Guard symbols are sometimes required in an uplink transmission. A guard symbol is an OFDM symbol left blank in the sense that a user equipment (UE) is not expected to transmit during a guard symbol. Guard symbols enable the UE to change power level, or transmit antenna.

SUMMARY

Certain challenges presently exist. For example, using SRS for sounding has the following disadvantages: i) an SRS occupies radio resources (resource elements), hence it comes with a capacity penalty (the number of resources occupied depends on several factors, including how many antennas the UE can use simultaneously, and how many guard symbols are required); ii) transmission/reception of an SRS requires processing resources (the amount of processing resources needed typically scales with the number of sounded ports and the bandwidth); iii) SRS comes with a cost in UE battery life (this is partly because of the actual transmission duration of SRS, but, if the UE is required to transmit SRS in a slot in which it is not scheduled for PUSCH there is also a cost associated with "waking up" circuitry in the UE); and iv) triggering of an aperiodic SRS has a cost in terms of signaling.

Similarly, using a DMRS for sounding has the following disadvantage: if the UE is equipped with N>1 transmit antennas, and the transmission rank (R) is less than N, then the channel measured on DMRS is not complete in the sense that the channel between every pair of a UE transmit antenna and a base station receive antenna cannot be inferred from the measurements. This means that a channel estimate based on DMRS may not be useful for determining precoding or rank for subsequent transmissions (in either UL or DL in systems relying on reciprocity). As an example, if DMRS and PUSCH is transmitted using antenna 1, then DMRS cannot be used to estimate the channel to antenna 0. Hence it cannot be used to determine if the channel to transmit antenna 0 is actually a better choice for transmission (or reception in the case of DL). Using DMRS for sounding, however, does in general mitigate the issues with SRS based sounding listed above.

Accordingly, in one aspect, there is provided a network node that is configured to determine to transmit a first reference signal. The network node is also configured to determine whether a second reference signal should be transmitted. The network node is also configured to transmit the first reference signal using a first precoder. The network node is also configured to transmit the second reference signal as a result of determining that the second reference signal should be transmitted. The second reference signal is transmitted using a second precoder that is complementary to the first precoder such that the second reference signal occupies a first part of a channel not occupied by the first reference signal.

In another aspect, there is provided a first network node being configured to receive a first reference signal transmitted by a second network node using a first precoder. The first network node is also configured to receive a second reference signal transmitted by the second network node using a second precoder that is complementary to the first precoder such that the second reference signal occupies a first part of a channel not occupied by the first reference signal. The first network node is also configured to i) use the first and second reference signals to generate a channel estimate (H) or use the first and second precoder to generate H.

In another aspect, there is provided a network node. The method includes determining to transmit a first reference signal. The method also includes determining whether a second reference signal should be transmitted. The method also includes transmitting the first reference signal using a first precoder. The method also includes transmitting the second reference signal as a result of determining that the second reference signal should be transmitted. The second reference signal is transmitted using a second precoder that is complementary to the first precoder such that the second reference signal occupies a first part of a channel not occupied by the first reference signal.

In another aspect, there is provided a method performed by a first network node. The method includes receiving a first reference signal transmitted by a second network node using a first precoder. The method also includes receiving a second reference signal transmitted by the second network node using a second precoder that is complementary to the first precoder such that the second reference signal occupies a first part of a channel not occupied by the first reference signal. The method also includes i) using the first and second reference signals to generate a channel estimate (H) or using the first and second precoder to generate H.

In another aspect, there is provided a first apparatus for communicating with a second apparatus. The first apparatus comprises processing circuitry and a memory. The memory contain instructions executable by the processing circuitry whereby the first apparatus is operative to determine to transmit a first reference signal. The first apparatus is further operative to determine whether a second reference signal should be transmitted. The first apparatus is further operative to transmit the first reference signal using a first precoder. The first apparatus is further operative to transmit the second reference signal as a result of determining that the second reference signal should be transmitted. The second reference signal is transmitted using a second precoder that is complementary to the first precoder such that the second reference signal occupies a first part of a channel not occupied by the first reference signal.

In another aspect, there is provided a first apparatus for communicating with a second apparatus. The first apparatus comprises processing circuitry and a memory. The memory contain instructions executable by the processing circuitry whereby the first apparatus is operative to receive a first reference signal transmitted by the second apparatus using a first precoder. The first apparatus is further operative to receive a second reference signal transmitted by the second apparatus using a second precoder that is complementary to the first precoder such that the second reference signal occupies a first part of a channel not occupied by the first reference signal. The first apparatus is further operative to i) use the first and second reference signals to generate a channel estimate (H) or use the first and second precoder to generate H.

There is also provided a computer program comprising instructions which when executed by processing circuitry of a network node causes the network node to perform any of the methods disclosed herein. In one embodiment, there is provided a carrier containing the computer program wherein the carrier is one of an electronic signal, an optical signal, a radio signal, and a computer readable storage medium.

The embodiments disclosed herein provide several advantages. For example, the embodiments enable a receiver to obtain a more complete picture of the full channel between the receiver and the transmitter of the complementary and complemented reference signals. The embodiments also enable a reduction in the amount of radio resources used because the complementary RS only needs to allow sounding of the part of the channel (subset of ports, or more generally channel subspace) that is not covered by the complemented RS (e.g., DMRS). As another example, UE battery consumption may be reduced because the complementary RS may be transmitted immediately after transmission of PUSCH/DMRS. The embodiments also reduce usage of radio resources and UE battery consumption. As yet another example, processing cost is also reduced due to the possibility to reuse the channel estimate from the complemented RS. As a further example, control channel signaling may be reduced, interference pattern created in the uplink resembles that of PUSCH, hence it becomes more predictable, and the use of the same bandwidth and power as DMRS may mitigate the need for guard symbols. Furthermore, for the same sounding overhead the sounding can be performed more often—leading to more accurate CSI.

BRIEF DESCRIPTION OF THE DRAWINGS

The accompanying drawings, which are incorporated herein and form part of the specification, illustrate various embodiments.

FIG. 5 is a flowchart illustrating a process according to some embodiments.

DETAILED DESCRIPTION

This disclosure describes use of a complementary reference signal (RS)—i.e., an RS that complements another RS (e.g., DMRS). The complementary RS together with the complemented RS (e.g., DMRS) enables a receiver to obtain a more complete picture of the full channel between the receiver and the transmitter of the reference signals. In some embodiments, the complementary RS is transmitted in separate orthogonal frequency division (OFDM) symbols from those used for a PUSCH transmission, and the complemented RS is transmitted using a precoder (denoted "first precoder") that is different from the precoder used for the transmission of the complementary RS (denoted "second precoder"). The second precoder is derived so that it complements the first precoder in that is allows the receiver to fuse the information derived from a channel estimate obtained based on the complemented RS with information derived from a channel estimate obtained based on the complimentary RS so that the receiver can obtain a more complete picture of the full channel.

The set of separate OFDM symbols during which the complementary RS may be derived using the set of OFDM symbols containing the PUSCH/complemented RS allocation. Additionally, the bandwidth of the complementary RS may be selected to match the bandwidth of the complemented RS. As an example, assuming that the complemented RS is a DMRS and the DMRS and PUSCH is transmitted in OFDM symbols 0-12 using antenna 1, then the complementary RS may be transmitted in OFDM symbol 13 using antenna 0. This allows the receiver to estimate the channel to both antenna 0 and antenna 1.

Figure 1:
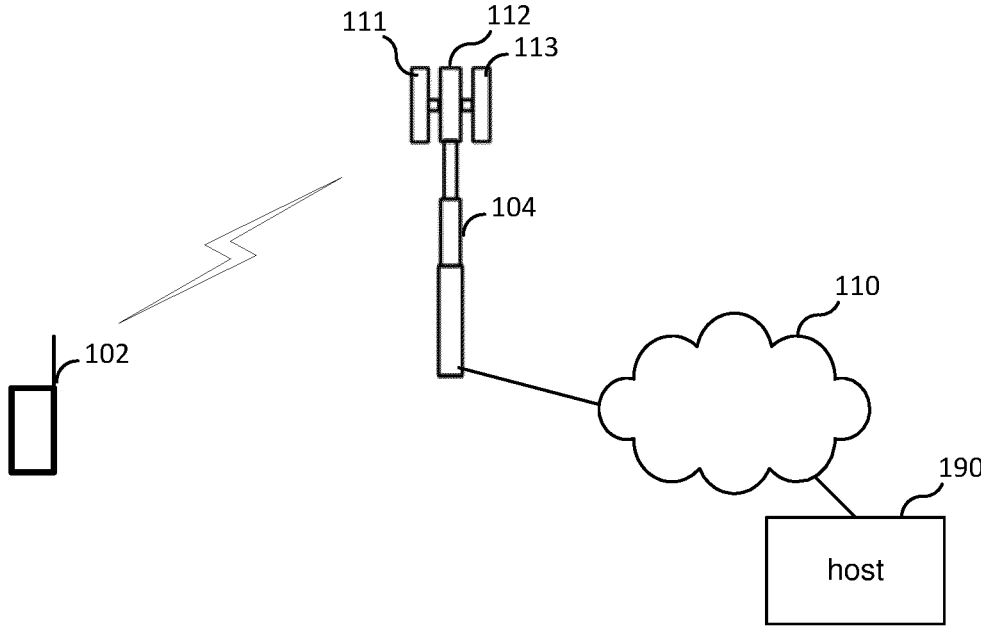
FIG. 1 illustrates a communication system according to an embodiment.

FIG. 1 illustrates a communication system 100 according to an embodiment. Communication system includes: an access network node 104 (also referred to herein as "access point (AP)") (e.g., a radio access network (RAN) node of a cellular network such as a 5G base station (gNB)) and a user equipment 102. As used herein a "UE" is any device (e.g., mobile phone, router, sensor, appliance, vehicle, smart meter, computer) capable of wireless communication with AP 104. As shown in FIG. 1, AP 104 enables UE 102 to access a host (e.g., a server or another UE) connected to a network 110 (e.g., the Internet). As also shown, AP 104 may comprise a number of antennas (in the example of FIG. 1, AP 104 includes antennas 111, 112, and 113, but in practice AP 104 may have more than three antennas).

Figure 2:
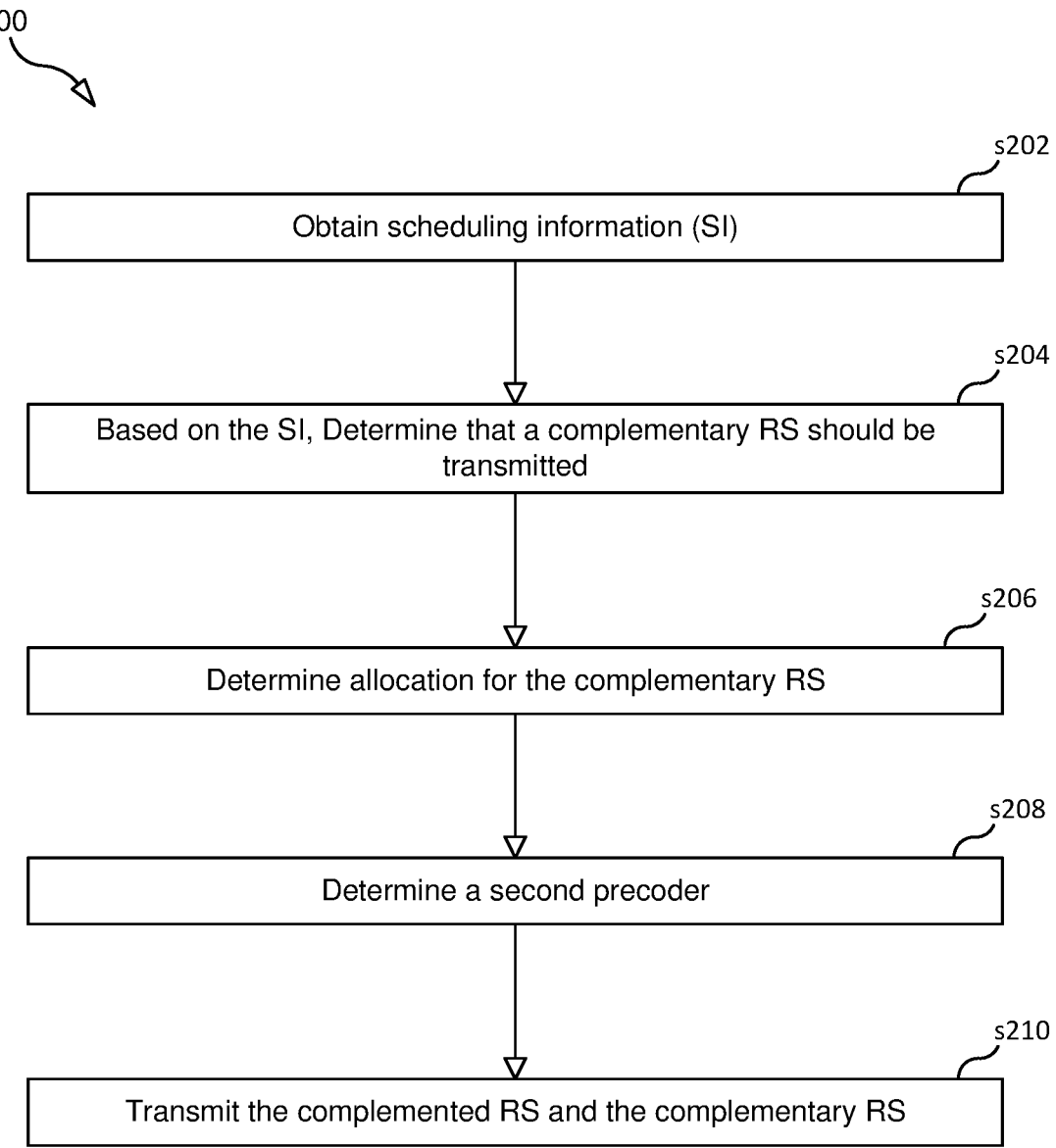
FIG. 2 is a flowchart illustrating a process according to some embodiments.

FIG. 2 is a flowchart illustrating a process 200, according to an embodiment, that is performed by a transmitting network node (e.g., UE 102 or AP 104). In the description that follows we will assume that UE 102 is the transmitting network node and AP 104 is the receiving network node. We will also assume that the complemented RS is a DMRS.

Step s202 comprises UE 102 receiving scheduling information (SI) transmitted by AP 104. In one embodiment, UE 102 uses the received SI to determine an allocation for the transmission of a data signal on the PUSCH and a DMRS. The allocation is the set of OFDM symbols and subcarriers used for the PUSCH/DMRS transmission. The SI may include information enabling UE 102 to determine a precoder for the PUSCH and DMRS transmission. For example, the precoder can in some cases be determined from a precoding matrix indicator (PMI) and a rank indicator (RI) included in the SI or pointed to by a pointer (e.g. index) included in the SI. The SI, in some embodiments, may also contain information that enables UE 102 to determine whether UE 102 should transmit a complementary RS (C-RS). This SI can be signaled using Downlink Control Information (DCI) and/or configured using Radio Resource Control (RRC) signaling.

Step s204 comprises UE 102 determining, based on the received SI, that a C-RS should be transmitted to complement the DMRS. In some embodiments the SI contains a trigger that triggers UE 102 to transmit the C-RS. In some embodiments there is a periodicity involved (e.g. UE 102 is configured to transmit C-RS every 10 slots, or if sounding has not been performed during the last 10 slots). In some embodiments, the determination is based on the rank indicator for the DMRS/PUSCH transmission. For example, the transmission of the C-RS may only take place if the rank R is smaller than a threshold (e.g., smaller than the number of antennas that UE 102 has or the number of antennas that may be sounded). In some embodiments, the determination is performed by determining if the PUSCH transmission is a msg3, msg5, or any early transmissions prior to the RRC_CONNECTED state.

Step s206 comprises UE 102 determining an allocation for the C-RS. That is, UE 102 determines the set of one or more OFDM symbols during which UE 102 will transmit the C-RS and determines the set of one or more subcarriers used for the transmission of the C-RS.

Figure 3A:
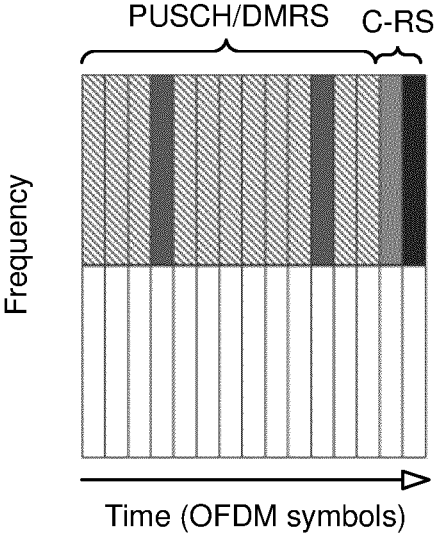
FIG. 3A illustrates a first example allocation.
Figure 3B:
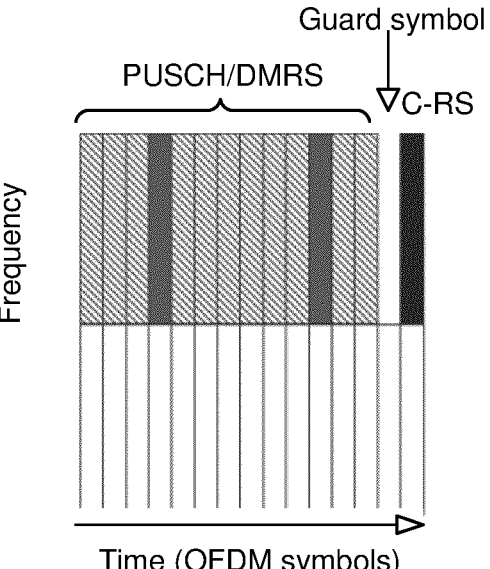
FIG. 3B illustrates a second example allocation.

The allocation may be related to the allocation of the PUSCH instance associated with the C-RS. In some embodiments, the C-RS is added immediately after or before the PUSCH allocation (to which the C-RS is associated). FIG. 3A and FIG. 3B illustrate examples of an embodiment according to which the C-RS is placed immediately after a PUSCH allocation (additionally, FIG. 3B shows the case where a guard symbol is included). A guard symbol may be needed in case different set of power amplifiers are used for first and second precoder. In FIG. 3A, two OFDM symbols are allocated to the C-RS; this is to be considered an example (the number of symbols may be configured and may depend on the number of ports of the C-RS or a configured repetition of the same port for increased coverage).

Step s208 comprises UE 102 determining a second precoder to use for the transmission of the C-RS. In some embodiments, the precoders may be specific per set of subcarriers (this is related to both the first and second precoder). It may in some embodiments be constant across the band (wideband). The purpose of the second precoder is to complement the first precoder used for the DMRS and PUSCH so that more aspects of the channel can be derived using a combination of a channel estimate measured based on the DMRS and a channel estimate measured based on the new reference signal. The first precoder is dented $P_1$ and the second precoder is denoted $P_2$. Assume that the precoding weights for layer r (r=1 . . . . R) of DMRS to antenna a is in $[P_1]_{a,r}$ (each column of $P_1$ is hence the precoder for the one of the R PUSCH layers). In one embodiment, $P_1=[0\ 1]^T$ and $P_2=[1\ 0]^T$. In this case, N=2 (i.e. number of available ports=2). In this example, the DMRS is transmitted on the second port only and the C-RS is transmitted on the first port only.

In general, it is advantageous to select $P_2$ so that the columns of $P_2$ are orthogonal to the columns of $$P_1 (\text{i.e., } P_2^H P_1 = 0).$$

There may also be further constraints on $P_2$, such as a power constraint (total or per antenna).

In some embodiments the dimensions of $P_2$ are $[A \times (A-R)]$ where A is the number of antennas (that are to be sounded in total using both DMRS and the new reference signal), and R is the transmission rank of DMRS and PUSCH.

In some embodiments, the UE can arbitrarily determine $P_2$ based on $P_1$ under the constraint above (an example of this may be UL reciprocity-based precoding). This can be performed using for example a singular value decomposition, a QR decomposition, or similar.

In some embodiment the relation between $P_1$ and $P_2$ is tabulated. For example, if $P_1$ is a function of a PMI, then $P_2$ may be a function of the PMI as well (e.g., a function of the PMI and R).

In some embodiments, each column of $P_1$ contains only a single non-zero value, and, in this case, $P_2$ may be constructed to be zero in the (antenna) positions where $P_1$ is non-zero. This can be implemented using the pseudo code shown in the below table 1.

TABLE 1

```
i := 1
[P₂]ₐ,ᵢ := 0
for a = 1..A
    if [P₁]ₐ,ₖ = 0 for all k then set [P₂]ₐ,ᵢ := α and set i := i + 1,
```

In some embodiments (where elements of $P_1$ are constant modulus) $P_1$ may be expressed as:

$$P_1 = \alpha [e^{ja} \quad e^{jb} \quad e^{jc} \quad e^{jd}]^T$$

7

(i.e., the DMRS is transmitted on all N ports)
and one can then construct orthogonal columns of P2 as:

$$P_2 = \alpha \begin{bmatrix} e^{ja} & -e^{jb} & e^{jc} & -e^{jd} \\ e^{ja} & e^{jb} & -e^{jc} & -e^{jd} \\ e^{ja} & -e^{jb} & -e^{jc} & e^{jd} \end{bmatrix}^T$$

(i.e., the C-RS is also transmitted on all N ports, but occupies a channel subspace not occupied by the DMRS).

In some embodiments, when the C-RS spans multiple OFDM symbols (see FIG. 3A for an example), then some of the ports may be transmitted in a set of symbols while the other ports may be transmitted in the other symbols. Then different columns of $P_2$ may be used in different OFDM symbols.

Step s210 comprises UE 102 transmitting the data signal, the DMRS, and the C-RS (not necessarily in that order). For the C-RS, the reference signal sequence and use of code-division multiplexing (CDM) (orthogonal cover code OCC, cyclic shifts) and combs to multiplex several ports (columns of $P_2$) may be done similarly as for DMRS. The sequence used may be based on a Gold sequence as defined in 3GPP TS 38.211 Section 5.2.1, or a Zadoff-Chu sequence (3GPP TS 38.211 Section 5.2.2). Initialization seeds $$(cinit, \ n_{ID}^{RS} \ \text{etc})$$

may be derived from those used for DMRS or SRS. The new reference signal may span one or more symbols (the number of symbols depends on the number of ports). In some embodiments the power used when transmitting the C-RS is derived from the power used when transmitting PUSCH and DMRS for PUSCH.

In some embodiments, PUSCH precoding is performed based on the SI received. The SI may contain the following: i) a Transmitted Precoding Matrix Indicator (TPMI), ii) a sounding reference signal resource indicator (SRI), or iii) a Transmission Configuration Indicator (TCI) which will indicate how the PUSCH precoding should be performed. This precoding may, or may not, relate to the C-RS and how it was transmitted. Examples include the following:

In one embodiment, the relation between $P_1$ and $P_2$, as discussed above, is known so that if $P_1$ is known at AP 104, then $P_2$ will also be known. This information can therefore be used by AP 104 to derive and signal a precoder (e.g. though TPMI) which relates to the (non-precoded) UE antenna ports.

In one embodiment, the relation between $P_1$ and $P_2$ is not known, and, thus, AP 104 can derive and signal a precoder (e.g. though TPMI) which relates to the precoded UE antenna ports. Hence, the precoder should be applied on top of $P_1$ and $P_2$.

In one embodiment AP 104 signals to UE 102 a set of indices that relate to the columns of $P_1$ and $P_2$. For example, indicating the vector [1, 4] may imply a rank 2 transmission where the first and fourth columns of $[P_1 \ P_2]$ should be used. As another example, indicating the vector [1, 2, 4] may imply a rank 3 transmission and so forth. SRI may be used for this indication but also other signaling approaches are possible.

In one embodiment AP 104 signals an index that relates to the columns of $P_1$ and $P_2$. This column should then be associated with a TCI when using beam management procedures. The TCI may in turn be used for PUSCH precoding.

Figure 4:
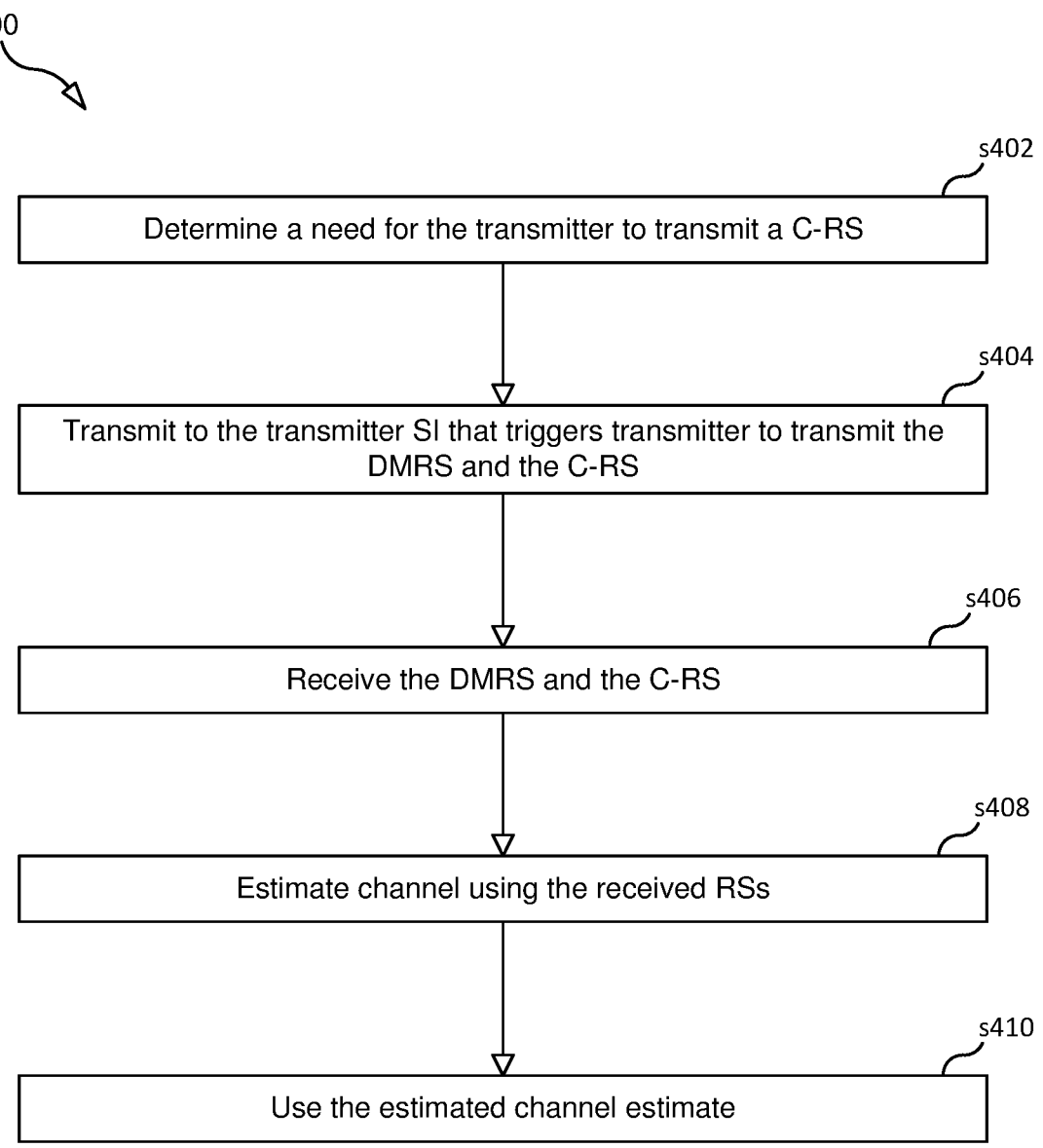
FIG. 4 is a flowchart illustrating a process according to some embodiments.

FIG. 4 is a flowchart illustrating a process 400, according to an embodiment, that is performed by a receiving network node (e.g., UE 102 or AP 104). In the description that follows we will assume that UE 102 is the transmitting network node and AP 104 is the receiving network node. We will also assume that the complemented RS is a DMRS.

Step s402 comprises AP 104 determining whether or not AP 104 should trigger UE 102 to transmit a C-RS. In some embodiment, the C-RS may be deemed necessary when one or more of the following conditions are true: i) a downlink transmission is imminent (in case the channel estimate is used for reciprocity-based precoding); ii) the stored channel estimate is deemed too old (in relation the expected rate of change of the channel) or there is no stored channel estimate; iii) the amount of data in the buffer is at a certain level. In some embodiments, there is no need for explicit slot by slot determination for the C-RS.

Step s404 comprises AP 104 transmitting to UE 102 certain SI for triggering UE 102 to transmit the DMRS and the C-RS.

Step s406 comprises AP 104 receiving the DMRS and the C-RS transmitted by UE 102.

Step s408 comprises AP 104 using the received RSs to generate a channel estimate. For example, in one embodiment, the DMRS is used by AP 104 to generate a first channel estimate ($H_1$), and the C-RS is used by AP 104 to generate a second channel estimate ($H_2$). An improved channel estimate (dented H) (a.k.a., as the "fused" channel estimate) can then be computed as: $H=[H_1 \ H_2]*[P_1 \ P_2]^{-1}$.

In some embodiments, $P_1$ and $P_2$ are unknown to AP 104. In such a case, the aggregated channel $[H_1 \ H_2]$ can be used in lieu of a true estimated channel (H). This is because with, e.g., some DL precoding algorithms, the quantity $[H_1 \ H_2]^H [H_1 \ H_2]$ is indeed equal to $H^H H$ under some conditions on $P_1$.

Step s410 comprises AP 104 using the generated channel estimate (H). In some embodiments, H is used to determine a precoder for the reverse link (e.g. the downlink). In some embodiments, H is used to determine a precoder for uplink (TPMI). In some embodiments, H is used to determine a rank indicator for DL or UL (PUSCH, PDSCH). In some embodiments, the estimated CSI is used to determine a transmission bandwidth. In some embodiments, H is used to determine a transport format (MCS).

In some embodiments, the C-RS is sent as a part of an initial access procedure. For example, a flag included in a System Information Block (SIB) (e.g., SIB1) could trigger UE 102 to send a C-RS in conjunction with "msg-3" (i.e., an UL message in a certain initial access procedure, after msg-1/RACH) to obtain early CSI for UE 102. Another possibility is to configure UE 102 to transmit the C-RS using RRC signaling. This may be easier to implement but does not provide as early CSI.

FIG. 5 is a flowchart illustrating a process 500, according to an embodiment, that is performed by a transmitting network node (e.g., UE 102 or AP 104). In the description that follows we will assume that UE 102 is the transmitting network node and AP 104 is the receiving network node. We will also assume that the complemented RS is a DMRS.

Step s502 comprises UE 102 determining to transmit a first reference signal (the DMRS).

Step s504 comprises UE 102 determining whether a second reference signal should be transmitted (the C-RS).

Step s506 comprises UE 102 transmitting the first reference signal using a first precoder.

Step s508 comprises UE 102 transmitting the second reference signal as a result of determining that the second reference signal should be transmitted, wherein the second reference signal is transmitted using a second precoder that is complementary to the first precoder such that the second reference signal occupies a first part of a channel not occupied by the first reference signal.

In some embodiments, the second reference signal occupies a second part of the channel that is also occupied by the first reference signal.

In some embodiments, the second precoder is a function of the first precoder, or the second precoder is derived using information used to derive the first precoder.

In some embodiments, the process also includes obtaining a precoder matrix indicator (PMI); using the PMI to determine the first precoder; and using the PMI to determine the second precoder.

In some embodiments, the process also includes transmitting a data signal on a shared channel using the first precoder. In some embodiments, the reference signal is transmitted using a total of M layers, and the data signal is transmitted using a total of M layers. In some embodiments, the first reference signal is a DMRS, and the DMRS is associated with the transmission of the data signal on a shared channel. In some embodiments, the second reference signal is transmitted after or before the transmission of the data signal. In some embodiments, the second reference signal is transmitted during symbol interval that immediately follows or immediately precedes a symbol interval during which the data signal was transmitted. In some embodiments, the second reference signal is transmitted during a symbol interval that immediately follows or immediately precedes a guard symbol interval that immediately follows or immediately precedes a symbol interval during which the data signal was transmitted. In some embodiments, the process also includes, based one or more OFDM symbols that are used for the transmission of the data signal or the first reference signal, deriving one or more OFDM symbols for the transmission of the second reference signal, and transmitting the second reference signal using the derived OFDM symbols.

In some embodiments, the process also includes, based the frequency band that is occupied by the first reference signal, deriving a frequency band for the transmission of the second reference signal, and transmitting the second reference signal using the derived frequency band.

In some embodiments, the transmitting network node comprises a first set of N antenna ports, the transmitting network node is configured to transmit the first reference signal using M of the N antenna ports, M<N, and the transmitting network node is configured to transmit the second reference signal using at least some of the other N-M antenna ports of the first set of N antenna ports that are not used to transmit the first reference signal.

In some embodiments, the transmitting network node transmits the second reference signal using all of the other N-M antenna ports of the first set of N antenna ports that are not used to transmit the first reference signal.

In some embodiments, the transmitting network node comprises a first set of N antennas, the transmitting network node transmits the first reference signal using M of the N antennas, M<N, and the transmitting network node transmits the second reference signal using at least some of the other N-M antennas of the first set of N antennas that are not used to transmit the first reference signal.

In some embodiments, the transmitting network node transmits the second reference signal using all of the other N-M antennas of the first set of N antennas that are not used to transmit the first reference signal.

In some embodiments, the transmitting network node is a UE or a node of a RAN.

In some embodiments, the first and second reference signals are transmitted using the same set of subcarriers.

In some embodiments, the first reference signal is transmitted using a first set of subcarriers within a first frequency band, and the second reference signal is transmitted using a second set subcarriers within the first frequency band. In some embodiments, each subcarrier within the first set of subcarriers is associated with an even subcarrier index and each subcarrier within the second set of subcarriers is associated with an odd subcarrier index, or each subcarrier within the first set of subcarriers is associated with an odd subcarrier index and each subcarrier within the second set of subcarriers is associated with an even subcarrier index.

In some embodiments, the process also includes obtaining scheduling information transmitted by a node of a radio access network, and using the scheduling information to determine whether the second reference signal should be transmitted. In some embodiments, the scheduling information triggers transmission of the first reference signal. In some embodiments, the scheduling information indicates one or more symbol intervals during which the first reference signal is to be transmitted and further indicates a set of subcarriers to use to transmit the first reference signal, and the scheduling information instructs the transmitting network node to transmit the second reference signal.

In some embodiments, the inner product of the first and second precoders is zero.

In some embodiments, the second precoder is expressed as a non-linear transformation of the first precoder such that the inner product of the first and second precoders is zero.

In some embodiments, the first precoder is a first matrix comprising X number of columns, the second precoder is a second matrix comprising X number columns, and the columns of the second precoder matrix are orthogonal to the columns of the first precoder matrix.

In some embodiments, the first precoder is a first matrix comprising X number of columns, the second precoder is a second matrix comprising X number columns, and the inner product of the columns of the second matrix and each of the columns of the first matrix is less than the norm of said columns. In some embodiments, each said column contains a set of antenna weights, and said inner product is across said antenna weights.

Figure 6:
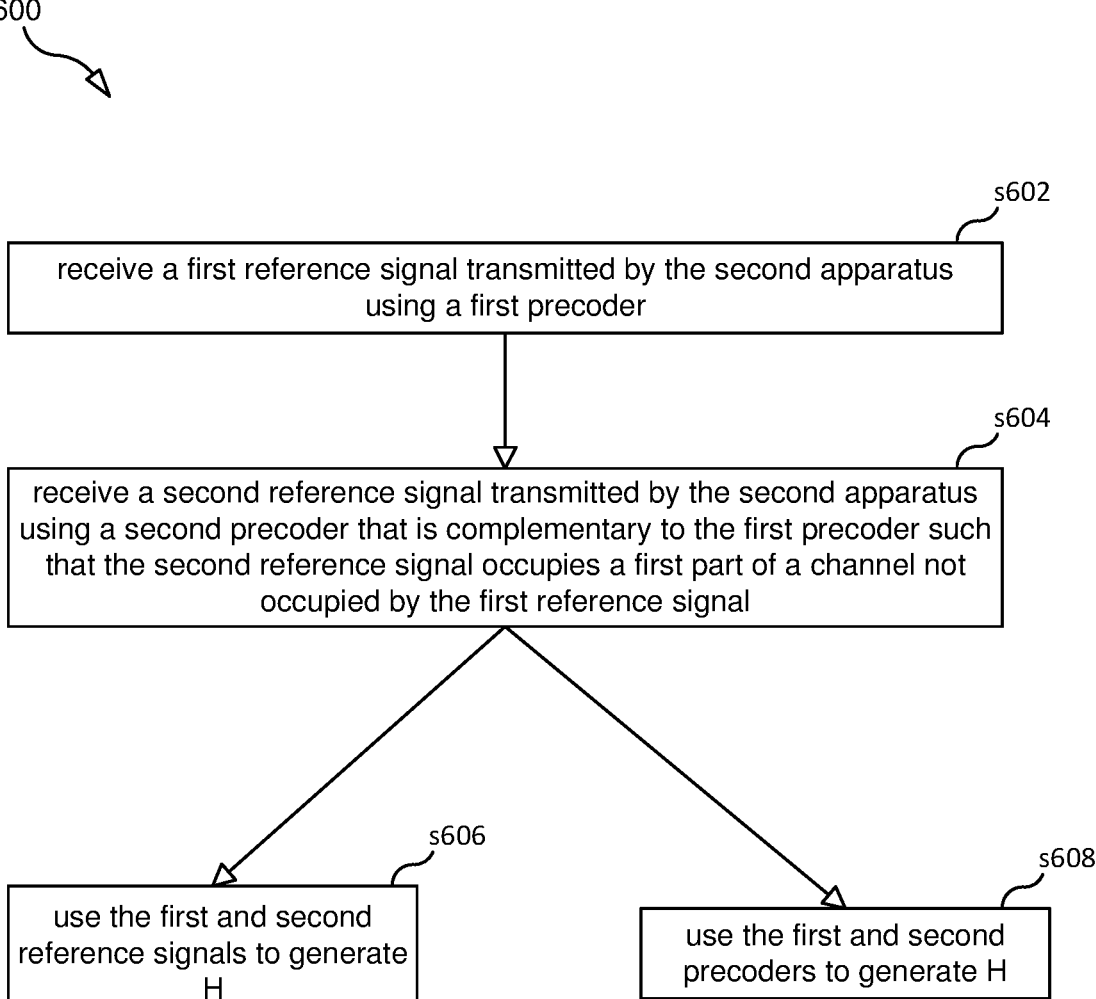
FIG. 6 is a flowchart illustrating a process according to some embodiments.

FIG. 6 is a flowchart illustrating a process 600, according to an embodiment, that is performed by a receiving network node (e.g., UE 102 or AP 104). In the description that follows we will assume that UE 102 is the transmitting network node and AP 104 is the receiving network node. We will also assume that the complemented RS is a DMRS.

Step s602 comprises AP 104 receiving a first reference signal (DMRS) transmitted by UE 102 using a first precoder.

Step s604 comprises AP 104 receiving a second reference signal (C-RS) transmitted by UE 102 using a second precoder that is complementary to the first precoder such that the second reference signal occupies a first part of a channel not occupied by the first reference signal. After step s604 at least one of step s606 or step s608 is performed.

Step s606 comprises AP 104 using the first and second reference signals to generate a channel estimate (H).

Step s608 comprises AP 104 using the first and second precoder to generate H.

In some embodiments, the receiving network node generates H by using the first reference signal to generate a first channel estimate (H1) and using H1 and the second reference signal to generate H.

In some embodiments, the second reference signal occupies a second part of the channel that is also occupied by the first reference signal.

In some embodiments, the second precoder is a function of the first precoder, or the second precoder is a derived using information used to derive the first precoder.

In some embodiments, the first reference signal is a DMRS, and the DMRS is associated with a transmission by the UE of a data signal on a shared channel. In some embodiments, the second reference signal is received after or before the transmission of the data signal. In some embodiments, the second reference signal is transmitted during symbol interval that immediately follows or immediately precedes a symbol interval during which the data signal was transmitted. In some embodiments, the second reference signal is transmitted during a symbol interval that immediately follows or immediately precedes a guard symbol interval that immediately follows or immediately precedes a symbol interval during which the data signal was transmitted.

In some embodiments, the receiving network node is a UE or a node of a RAN.

In some embodiments, the first and second reference signals are transmitted using the same set of subcarriers.

In some embodiments, the first reference signal is transmitted using a first set of subcarriers within a first frequency band, and the second reference signal is transmitted using a second set subcarriers within the first frequency band. In some embodiments, each subcarrier within the first set of subcarriers is associated with an even subcarrier index and each subcarrier within the second set of subcarriers is associated with an odd subcarrier index, or each subcarrier within the first set of subcarriers is associated with an odd subcarrier index and each subcarrier within the second set of subcarriers is associated with an even subcarrier index.

In some embodiments, the receiving network node transmits scheduling information to the transmitting network node, the scheduling information indicates one or more symbol intervals during which the first reference signal is to be transmitted and further indicates a set of subcarriers to use to transmit the first reference signal, and the scheduling information instructs the transmitting network node to transmit the second reference signal.

Figure 7:
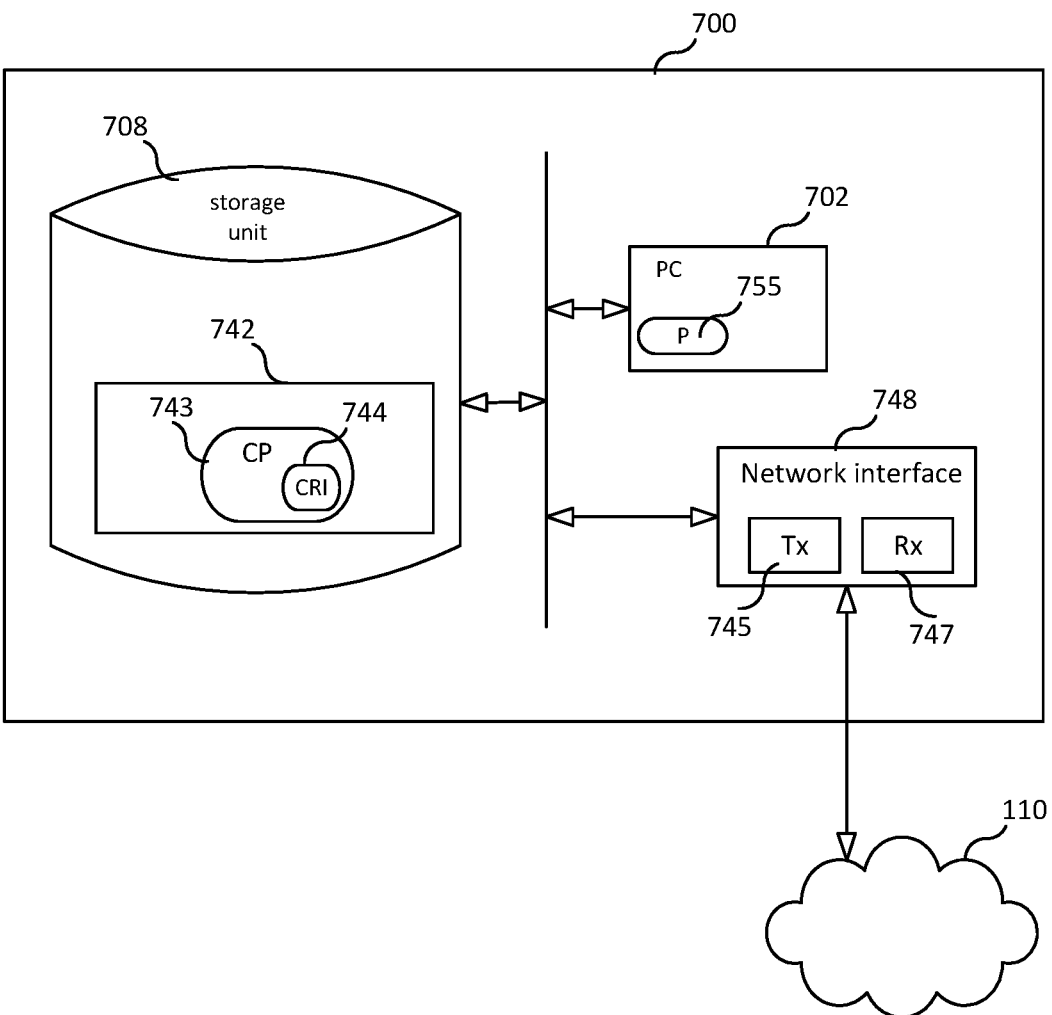
FIG. 7 is a block diagram of a network node according to some embodiments.

FIG. 7 is a block diagram of a network node 700, according to some embodiments, that can implement any one or more of the network nodes described herein (e.g., AP 104 or UE 102). That is, network node 700 can perform the above described methods. As shown in FIG. 7, network node 700 may comprise: processing circuitry (PC) 702, which may include one or more processors (P) 755 (e.g., a general purpose microprocessor and/or one or more other processors, such as an application specific integrated circuit (ASIC), field-programmable gate arrays (FPGAs), and the like), which processors may be co-located in a single housing or in a single data center or may be geographically distributed (i.e., network node 700 may be a distributed computing apparatus); at least one network interface 748 comprising a transmitter (Tx) 745 and a receiver (Rx) 747 for enabling network node 700 to transmit data to and receive data from other nodes connected to a network 110 (e.g., an Internet Protocol (IP) network) to which network interface 748 is connected (directly or indirectly) (e.g., network interface 748 may be wirelessly connected to the network 110 via an AP and a core network, in which case network interface 748 is connected to an antenna arrangement); and a storage unit (a.k.a., "data storage system") 708, which may include one or more non-volatile storage devices and/or one or more volatile storage devices. In embodiments where PC 702 includes a programmable processor, a computer readable medium (CRM) 742 may be provided. CRM 742 stores a computer program (CP) 743 comprising computer readable instructions (CRI) 744. CRM 742 may be a non-transitory CRM, such as, magnetic media (e.g., a hard disk), optical media, memory devices (e.g., random access memory, flash memory), and the like. In some embodiments, the CRI 744 of computer program 743 is configured such that when executed by PC 702, the CRI causes network node 700 to perform steps described herein (e.g., steps described herein with reference to the flow charts). In other embodiments, network node 700 may be configured to perform steps described herein without the need for code. That is, for example, PC 702 may consist merely of one or more ASICs. Hence, the features of the embodiments described herein may be implemented in hardware and/or software.

CONCLUSION

In summary, this disclosure describes, among other things, that a complementary reference signal can be used to complement a DMRS in such a way that DMRS and the complementary reference signal together allows for a more complete channel to be obtained at the receiver side (e.g., gNB side). The complementary reference signal is designed to complement DMRS while keeping its footprint small.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:
1. A network node, the network node being configured to:
determine to transmit a first reference signal;
determine whether a second reference signal should be transmitted;
transmit the first reference signal using a first precoder; and
transmit the second reference signal as a result of determining that the second reference signal should be transmitted, wherein,
the second reference signal is transmitted using a second precoder that is complementary to the first precoder such that the second reference signal occupies a first part of a channel not occupied by the first reference signal.
2. The network node of claim 1, wherein the second reference signal occupies a second part of the channel that is also occupied by the first reference signal.
3. The network node of claim 1, wherein the network node is further configured to:
obtain a precoder matrix indicator, PMI;

use the PMI to determine the first precoder; and use the PMI to determine the second precoder.

4. The network node of claim 1, wherein the network node is further configured to transmit a data signal on a shared channel using the first precoder.

5. The network node of claim 4, wherein, the first reference signal is a demodulation reference signal, DMRS, and the DMRS is associated with the transmission of the data signal on a shared channel.

6. The network node of claim 4, wherein the second reference signal is transmitted after or before the transmission of the data signal and either wherein the second reference signal is transmitted during symbol interval that immediately follows or immediately precedes a symbol interval during which the data signal was transmitted or wherein the second reference signal is transmitted during a symbol interval that immediately follows or immediately precedes a guard symbol interval that immediately follows or immediately precedes a symbol interval during which the data signal was transmitted.

7. The network node of claim 1, wherein the network node comprises a first set of N antennas, wherein N is an integer greater than 1, the network node is configured to transmit the first reference signal using M of the N antennas, M<N, wherein M is an integer greater than 1, and the network node is configured to transmit the second reference signal using at least some of the other N-M antennas of the first set of N antennas that are not used to transmit the first reference signal and/or wherein the network node is configured to transmit the second reference signal using all of the other N-M antennas of the first set of N antennas that are not used to transmit the first reference signal.

8. The network node of claim 1, wherein the network node is a user equipment, UE, or the network node is a node of a radio access network, RAN.

9. The network node of claim 1, wherein the first and second reference signals are transmitted using the same set of subcarriers.

10. The network node of claim 1, wherein the first reference signal is transmitted using a first set of subcarriers within a first frequency band, and the second reference signal is transmitted using a second set subcarriers within the first frequency band or wherein each subcarrier within the first set of subcarriers is associated with an even subcarrier index and each subcarrier within the second set of subcarriers is associated with an odd subcarrier index, or each subcarrier within the first set of subcarriers is associated with an odd subcarrier index and each subcarrier within the second set of subcarriers is associated with an even subcarrier index.

11. The network node of claim 1, wherein the network node is further configured to:

obtain scheduling information transmitted by a node of a radio access network, and use the scheduling information to determine whether the second reference signal should be transmitted.

12. The network node of claim 11, wherein the scheduling information triggers transmission of the first reference signal or wherein the scheduling information indicates one or more symbol intervals during which the first reference signal is to be transmitted and further indicates a set of subcarriers to use to transmit the first reference signal, and the scheduling information instructs the network node to transmit the second reference signal.

13. The network node of claim 1, wherein the first precoder is a first matrix comprising X number of columns, the second precoder is a second matrix comprising X number columns, and the columns of the second precoder matrix are orthogonal to the columns of the first precoder matrix or, wherein the first precoder is a first matrix comprising X number of columns, the second precoder is a second matrix comprising X number columns, and the inner product of the columns of the second matrix and each of the columns of the first matrix is less than the norm of said columns.

14. A first network node, the first network node being configured to:

receive a first reference signal transmitted by a second network node using a first precoder;

receive a second reference signal transmitted by the second network node using a second precoder that is complementary to the first precoder such that the second reference signal occupies a first part of a channel not occupied by the first reference signal, wherein the first and second reference signals are received on the same set of subcarriers or wherein the first reference signal is received on a first set of subcarriers within a first frequency band and the second reference signal is received on a second set subcarriers within the first frequency band; and use the first and second reference signals to generate a channel estimate, H, or use the first and second precoder to generate H.

15. The first network node of claim 14, wherein the first reference signal is a demodulation reference signal, DMRS, and the DMRS is associated with a transmission by the second network node of a data signal on a shared channel and wherein the second reference signal is received after or before the transmission of the data signal and either wherein the second reference signal is received during symbol interval that immediately follows or immediately precedes a symbol interval during which the data signal was transmitted or wherein the second reference signal is received during a symbol interval that immediately follows or immediately precedes a guard symbol interval that immediately follows or immediately precedes a symbol interval during which the data signal is received.

16. The first network node of claim 14, wherein the first network node is a user equipment, UE, or the first network node is a node of a radio access network, RAN.

17. The first network node of claim 14, wherein each subcarrier within the first set of subcarriers is associated with an even subcarrier index and each subcarrier within the second set of subcarriers is associated with an odd subcarrier index, or each subcarrier within the first set of subcarriers is associated with an odd subcarrier index and each subcarrier within the second set of subcarriers is associated with an even subcarrier index.

18. A method performed by a network node, the method comprising:

determining to transmit a first reference signal;

determining whether a second reference signal should be transmitted;

transmitting the first reference signal using a first precoder; and transmitting the second reference signal as a result of determining that the second reference signal should be transmitted, wherein the second reference signal is transmitted using a second precoder that is complementary to the first precoder such that the second reference signal occupies a first part of a channel not occupied by the first reference signal.

19. A method performed by a first network node, the method comprising:

receiving a first reference signal transmitted by a second network node using a first precoder;

receiving a second reference signal transmitted by the second network node using a second precoder that is complementary to the first precoder such that the second reference signal occupies a first part of a channel not occupied by the first reference signal, wherein the first and second reference signals are received on the same set of subcarriers or wherein the first reference signal is received on a first set of subcarriers within a first frequency band and the second reference signal is received on a second set subcarriers within the first frequency band; and using the first and second reference signals to generate a channel estimate, H, or using the first and second precoder to generate H.

\* \* \* \* \*